United States Patent
Geiger

(10) Patent No.: US 9,314,844 B2
(45) Date of Patent: Apr. 19, 2016

(54) METHOD FOR PRODUCING A COMPONENT WITH AT LEAST ONE ELEMENT ARRANGED IN THE COMPONENT

(75) Inventor: Peter Geiger, Munich (DE)

(73) Assignee: MTU Aero Engines GmbH, Munich (DE)

(*) Notice: Subject to any disclaimer, the term of this patent is extended or adjusted under 35 U.S.C. 154(b) by 421 days.

(21) Appl. No.: 13/441,081

(22) Filed: Apr. 6, 2012

(65) Prior Publication Data

US 2012/0266439 A1 Oct. 25, 2012

(30) Foreign Application Priority Data

Apr. 15, 2011 (EP) .................................. 11162568
May 23, 2011 (EP) .................................. 11167147

(51) Int. Cl.
| | | |
|---|---|---|
| B23P 17/04 | (2006.01) | |
| B22F 3/105 | (2006.01) | |
| B22F 5/00 | (2006.01) | |
| B22F 7/06 | (2006.01) | |

(52) U.S. Cl.
CPC .............. *B22F 3/1055* (2013.01); *B22F 5/009* (2013.01); *B22F 7/06* (2013.01); *Y02P 10/295* (2015.11); *Y10T 29/49826* (2015.01); *Y10T 428/13* (2015.01); *Y10T 428/31504* (2015.04)

(58) Field of Classification Search
CPC ........... F02C 7/20; F01D 25/18; F01D 25/12; F01D 11/24; F01D 25/14; B29L 2031/26
USPC ........... 29/527.1, 889, 889.2, 889.21, 889.22, 29/889.3, 889.61, 889.721, 889.722; 60/39.08, 209, 211, 796, 797; 415/177, 415/178

See application file for complete search history.

(56) References Cited

U.S. PATENT DOCUMENTS

| | | | | |
|---|---|---|---|---|
| 2004/0187714 | A1* | 9/2004 | Napadensky et al. | 101/35 |
| 2008/0290215 | A1* | 11/2008 | Udall et al. | 244/123.14 |
| 2010/0191360 | A1* | 7/2010 | Napadensky et al. | 700/98 |
| 2010/0275572 | A1* | 11/2010 | Durocher et al. | 60/39.08 |
| 2011/0052412 | A1 | 3/2011 | Ader et al. | |
| 2011/0056204 | A1* | 3/2011 | Ryan | 60/734 |

FOREIGN PATENT DOCUMENTS

| | | |
|---|---|---|
| DE | 102006 049 218 | 4/2006 |
| DE | 10 2006 049 216 | 4/2008 |
| DE | 10 2006 062 373 | 6/2008 |

OTHER PUBLICATIONS

Bressau et al: "Rapid Prototyping," Institut fuer Architektur and Medien, TU-Graz, 2009, (27 pages); (see machine translation of brief summary of reference).

* cited by examiner

*Primary Examiner* — David Bryant
*Assistant Examiner* — Lee A Holly
(74) *Attorney, Agent, or Firm* — Davidson, Davidson & Kappel, LLC

(57) ABSTRACT

A method for manufacturing a component having at least one element configured in the component, in particular at least one conduit, conduit unit, or supporting element configured within an aerodynamic rib, the component having an element leadthrough for leading through the at least one element, the method including the following step: building up in layers of the component including the element leadthrough, together with the at least one element in a generative production process.

22 Claims, 7 Drawing Sheets

U.S. Patent    Apr. 19, 2016    Sheet 1 of 7    US 9,314,844 B2

METHOD FOR PRODUCING A COMPONENT WITH AT LEAST ONE ELEMENT ARRANGED IN THE COMPONENT

This claims the benefit of European Patent Applications EP 111 625 68.7, filed Apr. 15, 2011 and EP 111 671 47.5, filed May 23, 2011, both of which are hereby incorporated by reference herein.

The present invention relates to a method for manufacturing a component having at least one element configured in the component, in particular an aerodynamic rib of a turbine connection housing of a gas turbine of an aircraft engine having at least one conduit, a conduit unit having at least one conduit or a supporting element as an element, as well as a component having at least one element.

BACKGROUND

The German Patent Application DE 10 2006 062 373 A1 describes a control block having a lightweight metallic construction for realizing a pneumatic or hydraulic circuit. The control block is manufactured to include cavities for accommodating integrated valves, as well as conduits in a generative production process.

A high-pressure turbine rotor is also known from the German Patent Application DE 10 2006 049 216 A1 that is designed as a blisk and has a radially inwardly configured disk, as well as a plurality of blades projecting therefrom. The blades are manufactured in a generative production process. No solidification takes place in the areas of the channels in the layered cross sections, so that the powder in these areas can be subsequently blown out to form the corresponding channels.

A method for manufacturing a gas turbine component is also described in the German Patent Application DE 10 2006 049 218 A1. In this context, a gas turbine component is produced in a sandwich structure where the outer walls form an integral part of the overall structure of the gas turbine component to be manufactured and are materially bonded to the inner structure defining the hollow spaces.

SUMMARY OF THE INVENTION

It is an object of the present invention to provide an improved method for manufacturing a component, in particular an aerodynamically contoured rib, which has at least one element or a conduit that is passed through the component.

The present invention provides a method for manufacturing a component having at least one element configured in the component, in particular at least one conduit, conduit unit, or supporting element configured within an aerodynamic rib, the component having an element leadthrough for leading through the at least one element, the method encompassing the following step: building up in layers of the component including the element leadthrough, together with the at least one element in a generative production process.

It is an advantageous feature of the method that the element, for example, a conduit or a supporting element, is formed together with the component, so that there is no need for the component, together with the element leadthrough thereof, to be dimensioned in advance to be large enough to enable the element to be subsequently inserted through the element leadthrough. As a result, the element of the aerodynamically contoured rib, for example, may, in addition, have a larger cross section or diameter at both ends, for example, than the element leadthrough of the component.

Advantageous embodiments and refinements of the present invention may be derived from the dependent claims, as well as from the description, while referring to the drawing.

In one specific embodiment according to the present invention, an intermediate space is formed between the element leadthrough and the at least one element, for example, a partially or completely peripherally extending intermediate space or gap. Here, the advantage is derived that the element does not touch the element leadthrough and, therefore, not the component and thus, for example, in the case of a hot component, the element, for instance a conduit, does not come in contact with the hot component.

In another specific embodiment according to the present invention, a retaining structure is provided in a predefined position on the element and/or the component for positioning the element in the element leadthrough of the component. This enables the component to be configured in such a way that the element therein already features the desired or intended position.

Another specific embodiment according to the present invention encompasses the formation of at least one structural rib between the element leadthrough of the component and the at least one element. This provides additional reinforcement of the structure of the element leadthrough and of the component and, moreover, allows both parts to be fixed to one another and, on the other hand, for example, makes it possible to minimize an unwanted transfer of heat between a hot component and the component, for example, a conduit.

Another specific embodiment according to the present invention encompasses filling the intermediate space or gap between the element leadthrough of the component and the element at least partially with an insulation material. This makes it possible, for example, for the element to be additionally insulated from the component and from the element leadthrough thereof.

Another specific embodiment according to the present invention provides for the intermediate space or gap to be formed between the element leadthrough of the component and the at least one component at least partially or completely peripherally around the element. The intermediate space or gap functions as insulation between the element and the element leadthrough of the component.

Another specific embodiment according to the present invention provides that the formation of at least one element at one or both ends of the same include a connection portion or a fastening flange; the connection portion, respectively the fastening flange having a greater cross section or diameter than the element leadthrough of the component. As a result, there is advantageously no need to enlarge the cross section, respectively diameter of the component, including the element leadthrough thereof, to ensure that the element is able to be passed through the element leadthrough thereof. Instead, the component, together with the element leadthrough thereof, and the element may be configured mutually independently, without having to take into account the inherent requirement of known methods heretofore of having to pass the element through the element leadthrough of the component at the end.

Another specific embodiment according to the present invention encompasses the formation of a connection portion (for example, of a conduit connection) at one or both ends of at least one conduit, the connection portion having a greater cross section or diameter than that of the component through which the conduit is passed. Here, the advantage is derived that, in the area of the component, the conduit may feature a flat conduit cross section; however, in the area of the connection portion, it may feature a circular cross section, for example, so that a larger conduit cross section is provided without having to take into account the inherent requirement of known methods of having to pass through the conduit leadthrough of the component at the end.

BRIEF DESCRIPTION OF THE DRAWINGS

The present invention is elucidated in the following on the basis of the exemplary embodiments indicated in the schematic figures of the drawing, whose figures show.

DETAILED DESCRIPTION

Figure 1:
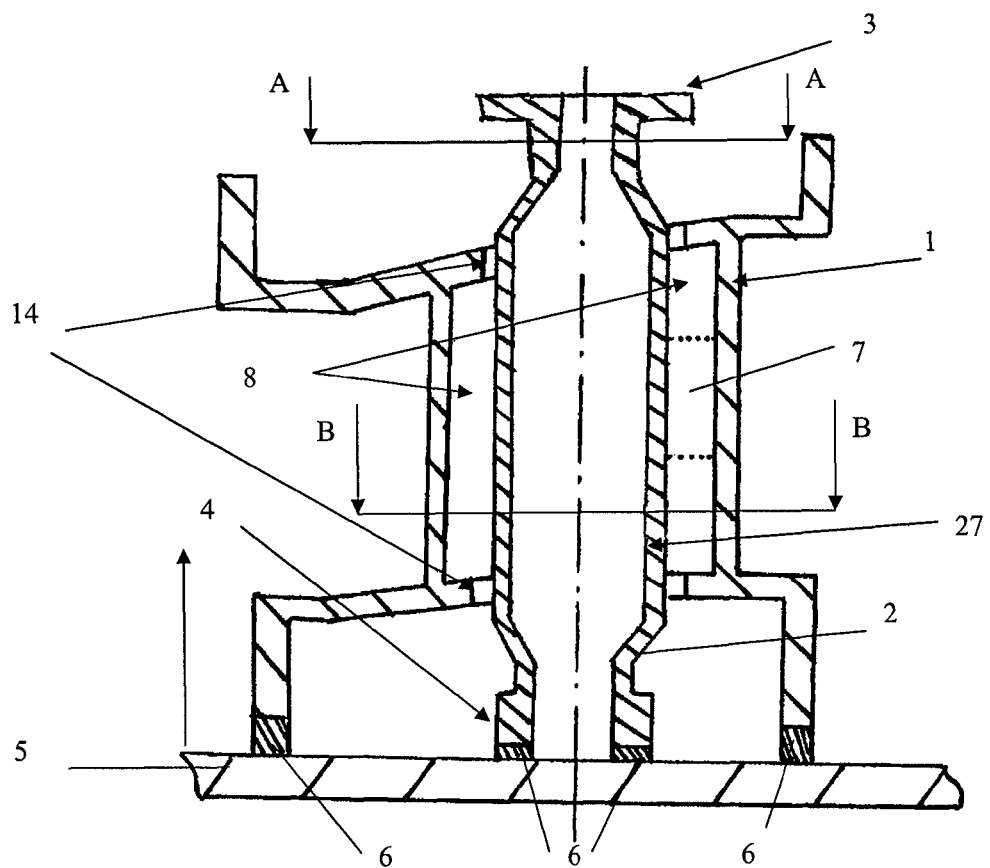
FIG. 1: a sectional view of an exemplary embodiment of an aerodynamically contoured rib and of the conduit thereof in accordance with the present invention, retaining structures of the rib and of the conduit having not yet been removed.

FIG. 1 shows a sectional view of an aerodynamically contoured rib 1 according to the present invention including a conduit 2 that was produced using the method according to the present invention. Conduit 2 is an example of an element 27 that is passed through rib 1. Besides a conduit 2, a supporting element or a conduit unit having a plurality of conduits may also be provided as element 27, as is illustrated and explained in the following with reference to FIGS. 5, 6 and 7.

The inherent problem of known methods is that they require that conduits 2, for example, for oil, having a specific cross section be passed through ribs 1, in particular aerodynamic ribs, the temperature of rib 1 necessitating that rib 1 and conduit 2 not come in contact with each other. In this case, however, a normally circular cross section of conduit 2 does not pass through the oval rib, for example, as is shown in the cross-sectional view in the subsequent FIG. 2.

Moreover, a circular connection 3, 4 for conduit 2 is to be provided at the same time on the top and bottom side of rib 1, respectively. It follows therefrom that it is either not possible to insert conduit 2 through the inside of rib 1, or it is necessary to considerably enlarge the cross section of rib 1, resulting consequently in aerodynamic disadvantages for rib 1.

An example of an aerodynamic or aerodynamically contoured rib 1, which is provided with at least one conduit 2, is a rib 1 of a turbine exit case (TEC) of a gas turbine of an aircraft engine, as is illustrated in the exemplary embodiment in FIG. 1.

Previous designs of turbine exit casings (TECs) having oil conduits have the inherent disadvantage of featuring relatively thick ribs, making it difficult for the conduits to be passed through.

Therefore, the present invention provides that conduit 2 in question be constructed as element 27 and, at the same time, rib 1 as a component having an element leadthrough 14 for corresponding conduit 2, as is illustrated in the exemplary embodiment in FIG. 1. In element leadthrough 14, which is used as a feed-through lead for conduit 2 as element 27, one or more conduits 2 may be provided. A plurality of element leadthroughs 14 may equally be configured in the rib, it being possible for at least one conduit to be passed through in each of the element leadthroughs.

In this context, FIG. 1 shows a base plate 5 or a carrier upon which rib 1, together with element leadthrough 14 thereof for passing through at least one conduit, and the at least one conduit 2 are jointly produced in layers in a generative process. Generative production processes include, for example, what is generally referred to as rapid manufacturing and what is generally known as rapid prototyping. In generative production, components are constructed, in particular, in layers by material deposition. In the corresponding methods, which are known as laser sintering, selective laser sintering (SLS), electron beam sintering, electron beam melting (EBM), lasercusing, selective laser melting (SLM) or 3D printing, the material to be added or deposited is processed in pulverulent form. The powder is deposited in layers on base plate 5 or on the carrier, for example. The powder layer is subsequently solidified to selectively form the component by energy radiation, such as, for example, a laser beam and/or electron beam. The particular pulverulent layer is typically solidified in this context on the basis of geometric data pertaining to the component to be manufactured.

The area of the pulverulent layer may be scanned, for example, and the section belonging to the corresponding component layer may be solidified by energy radiation. Under the action of the energy radiation, the powder melts or sinters in this area. In the case of 3D printing, the pulverulent layer is solidified in that a binding agent is selectively introduced into the regions belonging to the component. The base plate or the carrier may subsequently be moved, for example, lowered by one layer thickness. A new pulverulent layer is subsequently deposited and solidified, in turn. In this manner, the rib, together with the conduit, may be constructed layer by layer.

Starting out from base plate 5, rib 1, element leadthrough 14 thereof and conduit 2 located in element leadthrough 14 (at the top in the arrow direction in FIG. 1) are built together simultaneously in the generative process in that conduit 2 is already located in the predefined or correct position thereof in rib 1, respectively element leadthrough 14 thereof.

The positioning of rib 1, respectively of element leadthrough 14 and conduit 2 thereof relative to one another may be ensured by retaining structures 6 that are likewise manufactured at the same time, as is illustrated in the exemplary embodiment in FIG. 1. These retaining structures 6 are removed upon completion of the production process. In some instances, a structural rib 7 may also be formed in accordance with the same method between rib 1 and conduit 2, as is indicated by a dotted line in the exemplary embodiment in FIG. 1. Structural rib 7 may also be optionally additionally provided with a preset breaking point, so that structural rib 7 initially permanently fixes element 27 in rib 1 in one position, it being possible for structural rib 7 to be later broken through at preset breaking point thereof, rendering element 27 slightly movable relative to rib 1, for example.

The advantage is derived in accordance with the present invention that substantially narrower ribs 1 may be formed, which has a very positive effect on the aerodynamics and the efficiency of the components. In the same way, the distance between a hot rib 1, for example, and a heat-sensitive conduit 2 may be increased, and/or an intermediate space 8 between rib 1 and conduit 2 may be filled with a suitable insulation material (not shown), for example, a heat-insulation layer, in particular a porous heat-insulation layer, in order to provide an insulation layer between rib 1 and conduit 2. An insulation layer may be formed, for example, as a cladding, for example, around conduit 2. The insulation layer, as cladding, may be configured and integrally fabricated to extend partially or completely peripherally between rib 1 and conduit 2. Alternatively, however, intermediate space 8 between rib 1 and conduit 2 may also be filled at least partially or completely with the insulation layer, for example, a heat-insulation layer, in particular a porous heat-insulation layer.

Figure 2:
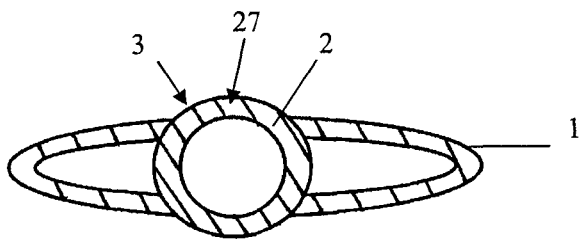
FIG. 2: a section A-A of the rib and in accordance with FIG. 1.

In the exemplary embodiment of a rib 1 having a conduit 2, as is shown in FIG. 1, conduit 2 is configured to pass through rib 1 and element leadthrough 14 thereof and, at upper and lower end thereof, features in each instance a corresponding connection portion 3, 4, for example, a circular connection portion 3, 4, as is also shown in subsequent section A-A in FIG. 2. A tempering medium for cooling and/or heating, such as oil, water or a gas, for example, may be fed to the connection portion.

To position conduit 2 relative to rib 1 and element leadthrough 14 thereof, corresponding retaining structures 6 may be configured, as needed, for example, at the end of rib 1 and/or at the end of conduit 2 to allow conduit 2 to be positioned within rib 1 and element leadthrough 14 thereof in a predefined position, in particular final position, as is illustrated in the exemplary embodiment in FIG. 1. Conduit 2 may be positioned within rib 1 in such a way that, for example, an intermediate space 8 or gap, such as a peripherally extending gap, is provided between conduit 2 and rib 1, respectively element leadthrough 14 thereof, so that conduit 2 does not make contact with rib 1. In the same way, at least one structural rib 7 may be configured, for example, between conduit 2 and rib 1, as is shown by a dotted line in the exemplary embodiment in FIG. 1, for example. As previously described, for the case that holder structures 6 are provided, as is shown in the exemplary embodiment in FIG. 1, these are subsequently removed, for example, milled off, etc.

A cross-sectional view taken along A-A in FIG. 2 is shown as a component in accordance with the exemplary embodiment in FIG. 1. As may be inferred from cross-sectional view taken along A-A, as element 27, conduit 2 features an upper end which is larger in cross section than rib 1. The upper end of the conduit is formed as connection portion 3, for example, and features a circular cross section, for example, whereas rib 1 has a smaller, for example, oval cross section.

Figure 3:
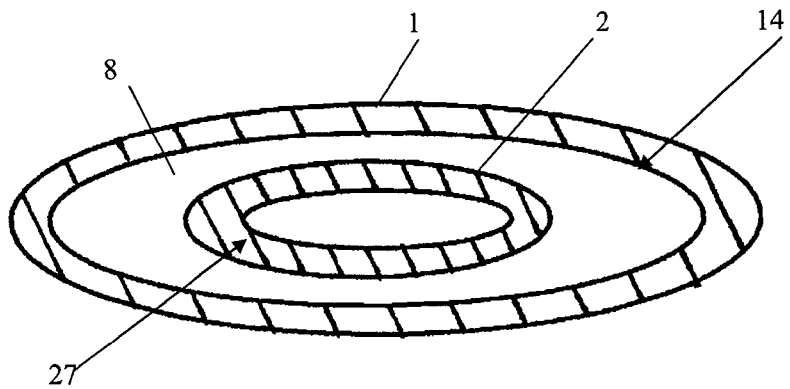
FIG. 3: a section B-B of the rib and of the conduit thereof in accordance with FIG. 1.
Figure 4:
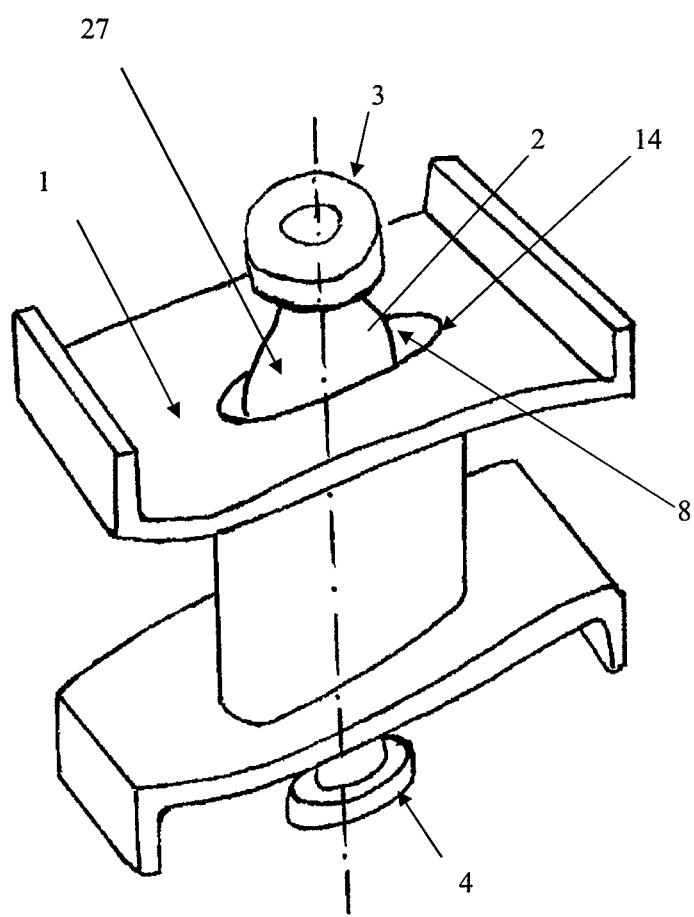
FIG. 4: a perspective view of a specific embodiment of the aerodynamically contoured rib according to the present invention including a conduit in accordance with FIG. 1.

FIG. 3 shows a cross-sectional view B-B taken along rib 1 in accordance with the exemplary embodiment in FIG. 1. In this connection, as element 27, conduit 2 features a smaller cross section in the interior of rib 1 (component) than rib 1, a peripherally extending gap or intermediate space 8 being formed between conduit 2 and rib 1, respectively element leadthrough 14 thereof. This makes it possible to ensure that conduit 2 does not come in contact with hot rib 1, for example, in the case of a rib 1 of a turbine exit case (TEC) of a gas turbine of an aircraft engine.

In an exemplary embodiment comparable to that in FIGS. 1, 2 and 3, FIG. 4 shows a perspective view of a rib 1 (component) according to the present invention and conduit 2 (element 27) thereof. Rib 1 has conduit 2, whose two ends form connection portions 3, 4, for example. Conduit 2 is passed through element leadthrough 14 of rib 1. Connection portions 3, 4 may each have a larger cross section than rib 1 and element leadthrough 14 thereof, so that conduit 2, if it had not been manufactured together with rib 1 in accordance with the present invention, could not be subsequently introduced into rib 1 and element leadthrough 14 thereof. Moreover, in the interior of rib 1, conduit 2 has a smaller cross section, in turn, than rib 1 and, together with rib 1, forms a gap or intermediate space 8, so that conduit 2 does not make contact with rib 1 on the inside.

Figure 5:
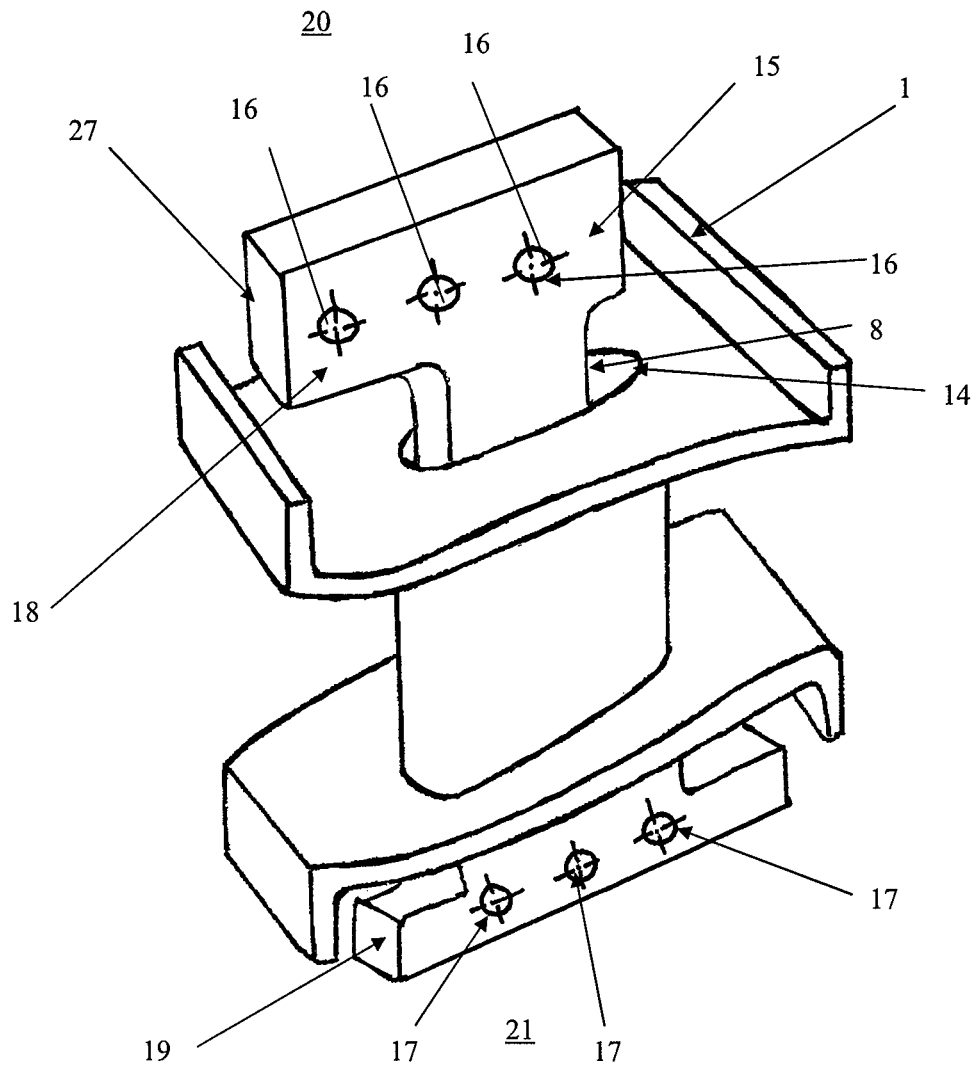
FIG. 5: a perspective view of another specific embodiment of an aerodynamically contoured rib according to the present invention including a supporting element.
Figure 6:
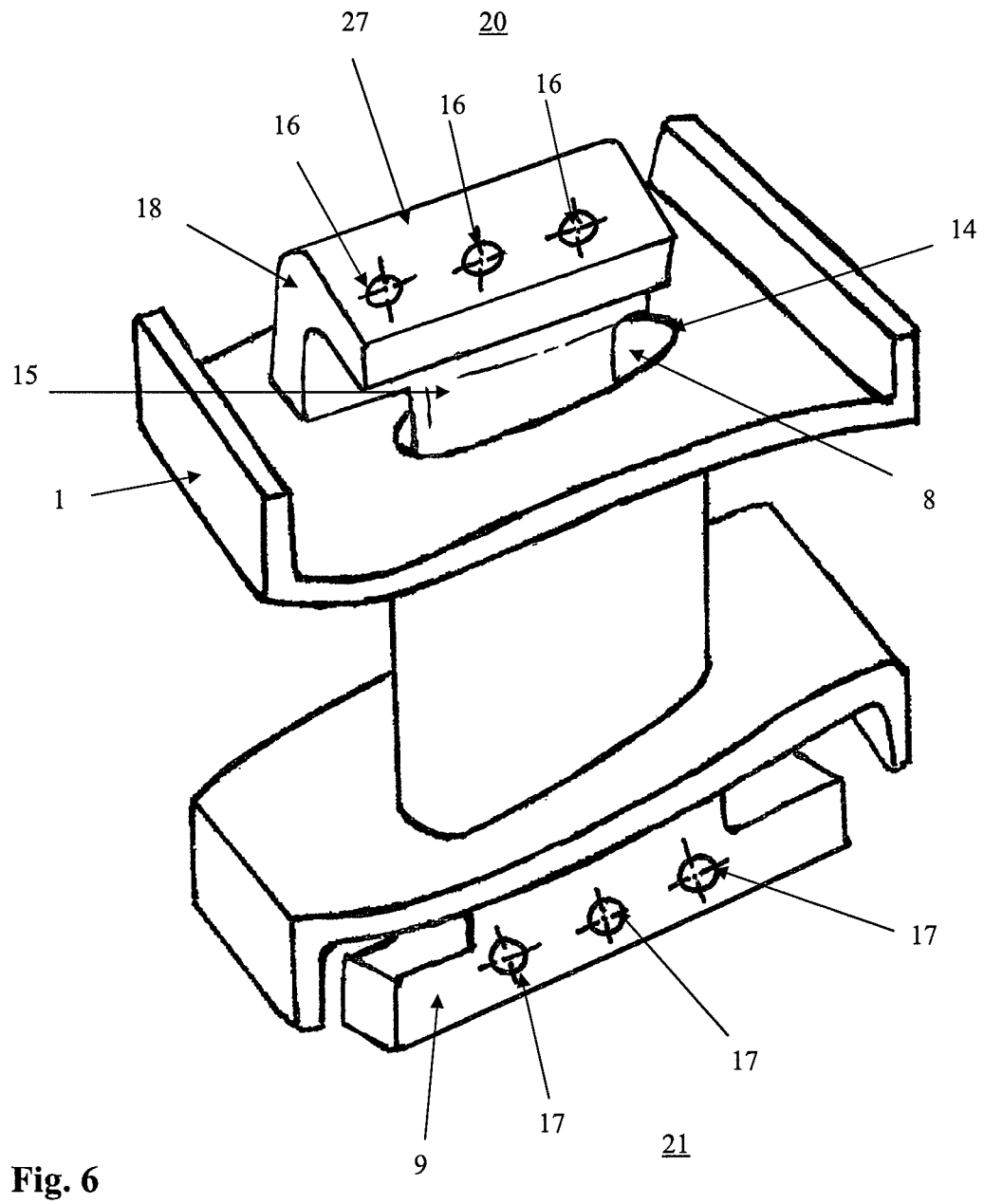
FIG. 6: a perspective view of a specific embodiment of an aerodynamically contoured rib according to the present invention including another supporting element.

Moreover, FIGS. 5 and 6 each show a perspective view of another rib 1 according to the present invention having a supporting element or brace 18 as a further example of element 27. Instead of a conduit as element, supporting element 15 for transmitting force is located in the interior of rib 1 in the two exemplary embodiments shown in FIGS. 5 and 6. Supporting element 15 is passed through an element leadthrough 14 in rib 1 comparably to the conduit in the exemplary embodiment in FIG. 1. Supporting element 15 may be used, for example, for the outward transmission of bearing forces from at least one bearing, for example, located in interior 21 of rib 1. However, the present invention is not limited to this special specific embodiment. Besides a bearing force, any other force may be transmitted by supporting element 15.

As shown in the exemplary embodiments in FIGS. 5 and 6, supporting element 15 features a first or outer fastening flange 18 and a second or inner fastening flange 19. As shown in FIGS. 5 and 6, each of fastening flanges 18, 19 may feature one or more fastening bores 16, respectively 17, for example, for connecting supporting element 15 by fastening flange 18, 19 thereof to other parts, for instance adjacent parts.

As an example of an element 27 in the exemplary embodiments of the present invention in FIGS. 5 and 6, as previously in the case of the conduit in the exemplary embodiments in FIG. 1 through 4, supporting element 15 is passed through element leadthrough 14 in rib 1.

The exemplary embodiments of the present invention, as shown in FIGS. 5 and 6, differ from one another merely in that flanges 18 and 19 have different designs, depending on the function and intended purpose. In the exemplary embodiment in FIG. 5, the two flanges 18, 19 are provided, for example, in a longitudinal plane of the rib. In the exemplary embodiment in FIG. 6, flanges 18, 19 are provided, for example, in turn, in a plane, for example, perpendicularly to a longitudinal plane of rib 1.

The generative construction of supporting element 15 as element 27 including flanges 18, 19 thereof (which, for example, each feature a greater spatial extent than element leadthrough 14), together with rib 1 as a component, has the advantage that element leadthrough 14 of rib 1 does not need to be dimensioned as large as previously required for the subsequent leading through of supporting element 15 along with flanges 18, 19 thereof. Instead, supporting element 15 and rib 1 are constructed jointly or integrally.

As previously described with reference to FIG. 1, for example, at least one retaining structure, at least one structural rib and/or an insulation layer may alternatively be additionally provided in an intermediate space 8 between supporting element 15 and rib 1. As was likewise previously described with reference to FIG. 1, in the exemplary embodiments in FIGS. 5 and 6, the insulation layer may also be formed as a cladding that is configured to extend partially or completely peripherally around supporting element 15 between rib 1 and supporting element 15 and, in particular, is integrally fabricated. Alternatively, the insulation layer may at least partially or completely fill intermediate space 8 between rib 1 and supporting element 15. As insulation layer, a heat-insulation layer, for example, a porous heat-insulation layer may be provided.

Figure 7:
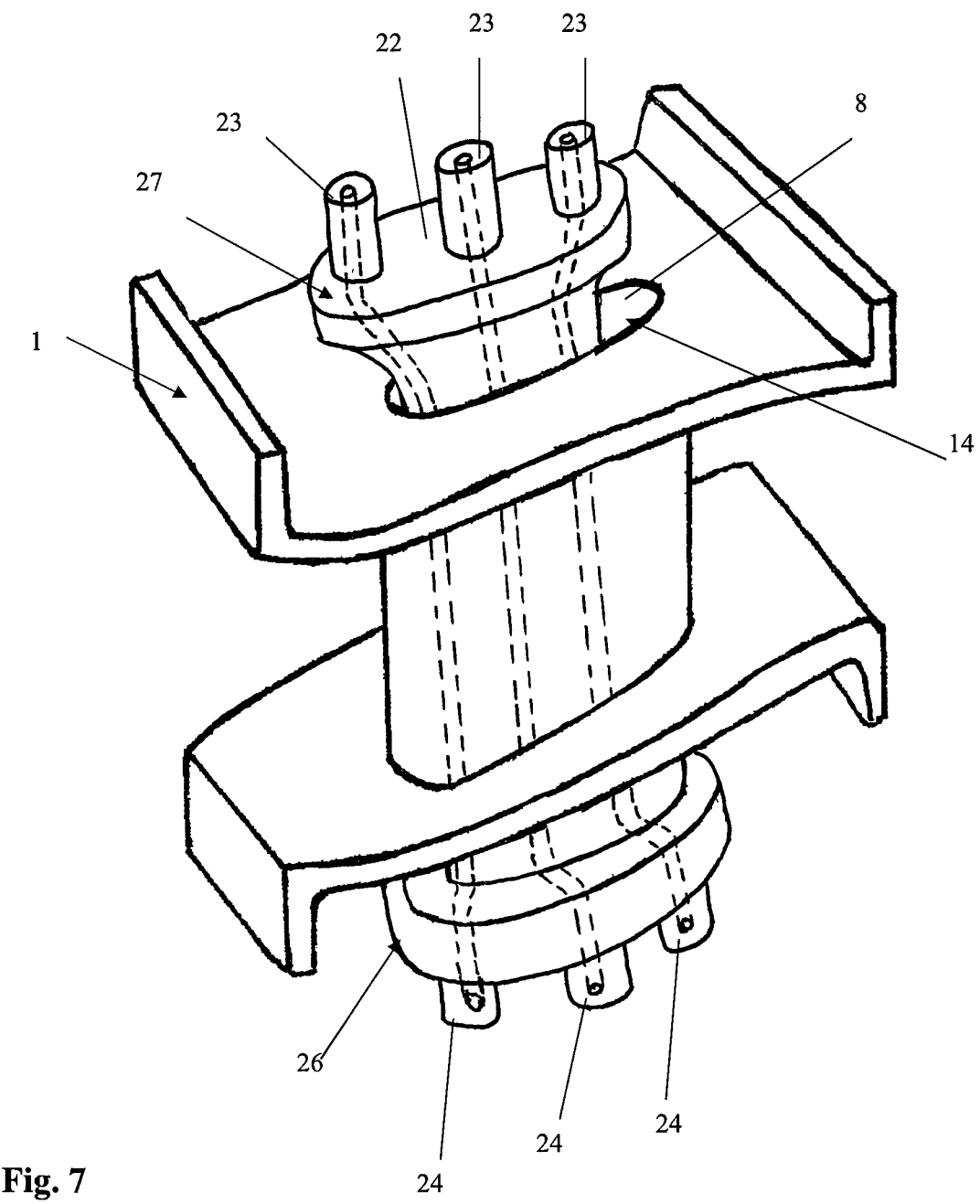
FIG. 7: a perspective view of another specific embodiment of an aerodynamically contoured rib according to the present invention including a conduit unit having a plurality of conduits.

FIG. 7 shows a perspective view of another specific embodiment according to the present invention of a rib 1 as a component and a conduit unit 22 as element 27 having a plurality of conduits 2. As an example of an element 27, conduit unit 22 is passed through an element leadthrough 14 in rib 1.

Conduits 2 are configured in a shared conduit unit 22. In this case, conduit unit 22 has at least two channels, for example, which form the at least two conduits 2. Conduit unit 22 is configured to extend through rib 1, respectively element leadthrough 14 of rib 1. Conduit unit 22 widens at both ends thereof outside of element leadthrough 14 or features a larger diameter and a larger cross section than element leadthrough 14 to enable first or top conduit connections 23 and second or bottom conduit connections 24 to have enough space at the ends. As shown in the exemplary embodiment in FIG. 7, these conduit connections 23, 24 may be configured at the end faces of the ends or laterally at the ends of conduit unit 22.

At least one retaining structure, at least one structural rib and/or an insulation layer may be additionally alternatively provided in an intermediate space 8 between conduit unit 22 and rib 1 as described previously with reference to the exemplary embodiment in FIG. 1, for example. As was previously described, likewise with reference to FIG. 1, in the exemplary embodiment in FIG. 7 as well, the insulation layer may be formed as a cladding that is configured to extend partially or completely peripherally around conduit unit 22 between rib 1 and conduit unit 22 and, in particular, is integrally fabricated. Alternatively, the insulation layer may also at least partially or completely fill intermediate space 8 between rib 1 and conduit unit 22. As insulation layer, a heat-insulation layer, for example, a porous heat-insulation layer may be provided.

Figure 8:
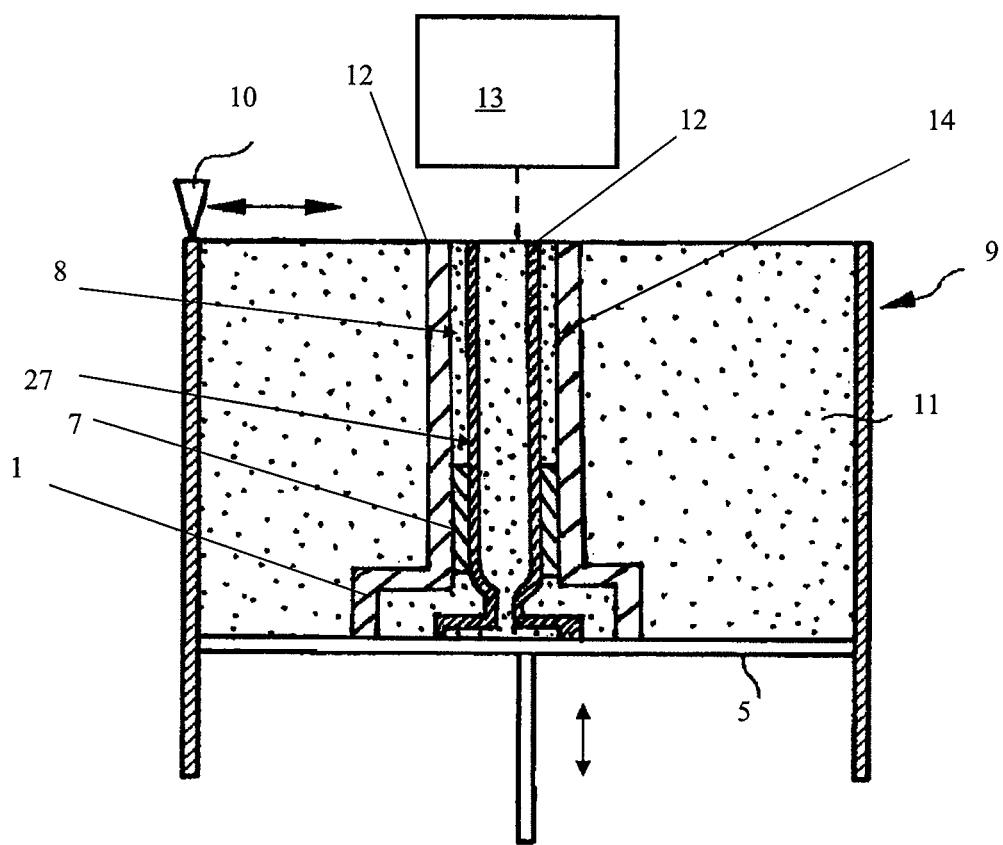
FIG. 8: a schematic view of an exemplary embodiment of the manufacturing method according to the present invention.

FIG. 8 shows a schematic view of an exemplary embodiment of the manufacturing method according to the present invention. Provided in this context is an upwardly and downwardly movable base plate 5 that is bounded by a frame 9, making it possible for a powder 11 to be received on base plate 5. Powder 11 is deposited, in particular in layers, via a coating device 10 onto base plate 5. Coating device 10 may, for example, feature a wiper device, as is shown in the exemplary embodiment in FIG. 8, a doctor blade and/or at least one powder feed nozzle, etc.

Following deposition of the pulverulent layer onto base plate 5, pulverulent layer in component regions 12 is solidified by an energy radiation source 13, such as a laser or an electron beam source, for example. Component regions 12, which, in this case, are solidified in the exemplary embodiment shown in FIG. 8, are constituted of component region rib 1 (component) and element leadthrough 14 thereof, and component region for element 27 (for example, a conduit, a conduit unit having at least two conduits or a supporting element), as well as component region for an additional structural rib 7 between rib 1 and element 27. In the case that additional retaining structures are provided, for example, as in the exemplary embodiment shown in FIG. 1, the component region for the retaining structure is also solidified by energy radiation source 13.

Base plate 5 is subsequently moved downwards by one pulverulent layer to enable the next pulverulent layer to be applied by coating device 10 and, subsequently thereto, component regions 12 of rib 1, of element 2 and, in some instances, of structural rib 7 to be solidified by energy radiation source 13.

Depending on the type of component that is to be produced, powder 11, to be applied by coating device 10, may be composed of one or a plurality of materials; for example, the powder may include at least a metal powder, a metal alloy powder, a ceramic powder and/or also a plastic powder, to name just a few examples of the powder. However, the present invention is not limited to these examples. As a general principle, each powder 11 composed of one material or a combination of materials may be used, that is suited for solidification by an energy radiation source 13, such as an electron beam or a laser beam, for example.

Figure 9:
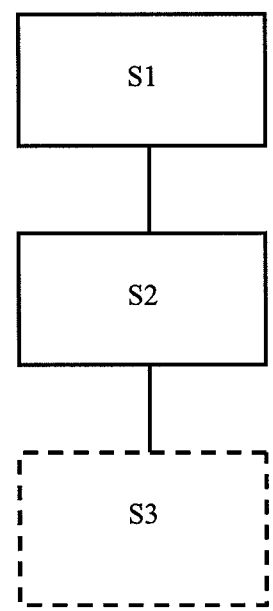
FIG. 9: a flow chart of a specific embodiment of the manufacturing method according to the present invention.

FIG. 9 shows a flow chart of an exemplary embodiment of the method according to the present invention for manufacturing a rib having an element configured therein, for example, a conduit, a conduit unit having at least two conduits or a supporting element. In a first step S1, a pulverulent layer is deposited on a base plate by a coating device. The pulverulent layer is subsequently solidified in a predefined component region of the rib, inclusive of the element leadthrough of the rib and in a predefined component region of the element, by energy radiation from an energy radiation source. In the interior of the rib, an intermediate space or gap may be provided between the component region of the rib and the component region of the element that is not solidified by energy radiation. The powder from this intermediate space may be removed later following manufacturing of the finished component, and the intermediate space be filled as the case may be by a suitable insulation material, for example, to insulate the rib from the element.

In a next step S2, the base plate form is lowered by one pulverulent layer, and the next pulverulent layer is deposited and solidified in the predetermined component regions of the rib and the element by energy radiation. Step S2 is repeated until, at the end, all component regions, out of which the rib and element thereof have been constructed, have been solidified.

In the case that at least one holder structure and/or a structural rib are provided, the corresponding component region is solidified for this purpose in step S1 and/or step S2 by energy radiation.

In an additional step S3, an existing retaining structure may be removed, for example, by milling, turning, sawing, etc., following completion of the rib and element thereof.

Although the present invention has been described above on the basis of preferred exemplary embodiments, it is not limited thereto, rather may be modified in numerous ways. In particular, the previously described exemplary embodiments, especially individual features thereof may be combined with one another.

The method according to the present invention encompasses both the complete manufacturing, repair and/or replacement of the component together with the conduit leadthrough thereof and the at least one conduit. This holds for all specific embodiments of the present invention.

LIST OF REFERENCE NUMERALS

1 rib
2 conduit
3 first connection
4 second connection
5 base plate
6 retaining structure
7 structural rib
8 intermediate space
9 frame
10 coating device 11 powder
12 component region
13 energy radiation source
14 element leadthrough
15 supporting element for the transmission of force
16 fastening bore
17 fastening bore
18 fastening flange
19 fastening flange
20 outer area
21 inward area
22 conduit unit
23 connection (conduit)
24 connection (conduit)
25 connection portion
26 connection portion
27 element

The invention claimed is:

1. A method for manufacturing an aerodynamically contoured rib of a gas turbine, at least one element configured in the aerodynamically contoured rib, the aerodynamically contoured rib having an element leadthrough for leading through the at least one element, the element leadthrough defining an opening in a wall of the aerodynamically contoured rib, the method comprising the following step:
   building up in layers the aerodynamically contoured rib including the element leadthrough, together with the at least one element, in a generative production process, the step of building up in layers further comprising forming an intermediate space between the element leadthrough and the at least one element at the opening in the wall of the aerodynamically contoured rib,
   wherein the building up in layers step further includes forming a structural rib to fix the element to the element leadthrough and wherein the method further comprises breaking the structural rib to render the element movable with respect to the leadthrough.

2. The method as recited in claim 1 wherein the at least one element includes at least one conduit, conduit unit, or supporting element configured within the aerodynamic rib.

3. The method as recited in claim 1 wherein the step of building up in layers further comprises:
   forming a retaining structure in a predefined position at the element or the aerodynamically contoured rib for positioning the element in the element leadthrough of the aerodynamically contoured rib.

4. The method as recited in claim 1 further comprising the step of:
   at least partially filling the intermediate space between the element leadthrough and the at least one element, at the opening in the wall of the aerodynamically contoured rib, with an insulation material.

5. The method as recited claim 1 wherein the intermediate space between the element leadthrough of the aerodynamically contoured rib and the at least one element is formed at least partially or completely peripherally around the element.

6. The method as recited in claim 1 wherein the step of building up in layers further comprises forming the at least one element at one or both ends of the same using a connection portion or a fastening flange, wherein the connection portion, or respectively, the fastening flange, is formed in the step of building up layers having a greater cross section or diameter than the element leadthrough of the aerodynamically contoured rib.

7. The method as recited in claim 1 wherein the aerodynamically contoured rib is part of a turbine exit case of a gas turbine of an aircraft engine, and the element is a conduit or a conduit unit having at least two conduits and the conduit or conduit unit is configured as a conduit or conduit unit for passing through a tempering medium.

8. The method as recited in claim 7 wherein the tempering medium is a cooling medium.

9. The method as recited in claim 8 wherein the cooling medium is air, water or oil.

10. The method as recited in claim 1 wherein the aerodynamically contoured rib is part of a turbine exit case of a gas turbine of an aircraft engine, and the element is a supporting element.

11. The method as recited in claim 10 wherein the supporting element is a supporting element for the transmission of force.

12. The method as recited in at claim 1 wherein the at least one element includes elements configurable separately from one another or as a shared element unit.

13. The method as recited in claim 12 wherein the elements are conduits.

14. An aerodynamically contoured rib produced by the method recited in claim 1.

15. The aerodynamically contoured rib as recited in claim 14 wherein a cross section of the at least one element is configured in the interior of the element leadthrough of the aerodynamically contoured rib to be smaller than the cross section of the element leadthrough.

16. The aerodynamically contoured rib as recited in claim 14 wherein a cross section or diameter of at least one portion of the at least one element is configured outside of the element leadthrough of the aerodynamically contoured rib to be greater than the cross section or the diameter of the element leadthrough.

17. The aerodynamically contoured rib as recited in claim 16 wherein the at least one portion is designed as a connection portion or as a fastening flange of the element, the connection portion being configured for feeding of a tempering medium thereto, and the fastening flange being configured for fastening at least one further part.

18. The aerodynamically contoured rib as recited in claim 14 wherein the aerodynamically contoured rib is formed together with the element leadthrough, together with a plurality of elements, the elements being formed separately from one another or as a common element unit.

19. The aerodynamically contoured rib as recited in claim 18 wherein the elements are conduits and further comprising a connection for each conduit.

20. The aerodynamically contoured rib as recited in claim 14 wherein the element is a conduit, a conduit unit having at least two conduits or a supporting element.

21. The aerodynamically contoured rib as recited in claim 20 wherein the element is a supporting element for the transmission of force.

22. The method as recited in claim 1 wherein the building up in layers step further comprises forming the at least one element with two connecting end portions each having a cross section larger than the element leadthrough.

* * * * *